United States Patent
Voigt et al.

(10) Patent No.: US 9,109,932 B2
(45) Date of Patent: Aug. 18, 2015

(54) PIPELINE OR MEASURING TUBE HAVING AT LEAST ONE LAYER WHICH INSULATES AT LEAST IN CERTAIN REGIONS, AND METHOD FOR THE MANUFACTURE THEREOF

(75) Inventors: Frank Voigt, Weil am Rhein (DE); Werner Wohlgemuth, Seewen (CH)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 1026 days.

(21) Appl. No.: 12/733,180

(22) PCT Filed: Jul. 10, 2008

(86) PCT No.: PCT/EP2008/058967
§ 371 (c)(1),
(2), (4) Date: Feb. 16, 2010

(87) PCT Pub. No.: WO2009/021787
PCT Pub. Date: Feb. 19, 2009

(65) Prior Publication Data
US 2010/0147085 A1    Jun. 17, 2010

(30) Foreign Application Priority Data
Aug. 14, 2007    (DE) .................. 10 2007 038 507

(51) Int. Cl.
*F16L 9/14* (2006.01)
*G01F 1/58* (2006.01)

(52) U.S. Cl.
CPC . *G01F 1/58* (2013.01); *Y10T 428/13* (2015.01)

(58) Field of Classification Search
CPC ............. F16L 9/02; F16L 9/14; F16L 59/161; F16L 59/00; F16L 59/147
USPC .................. 138/141, 149; 73/778, 514.31
See application file for complete search history.

(56) References Cited

U.S. PATENT DOCUMENTS

| | | | | |
|---|---|---|---|---|
| 2,576,610 | A * | 11/1951 | Kunzog | 138/41 |
| 2,925,831 | A * | 2/1960 | Welty et al. | 138/141 |
| 3,396,641 | A * | 8/1968 | Welty et al. | 404/82 |
| 3,415,288 | A | 12/1968 | Marshack | |
| 3,556,158 | A * | 1/1971 | Schneider | 138/149 |
| 3,693,665 | A * | 9/1972 | Veerling et al. | 138/149 |
| 3,812,886 | A * | 5/1974 | Hallwood | 138/149 |
| 4,348,243 | A * | 9/1982 | Craubner | 156/71 |
| 4,458,723 | A * | 7/1984 | Nojiri et al. | 138/149 |
| 4,590,971 | A * | 5/1986 | Webster et al. | 138/149 |
| 4,663,205 | A * | 5/1987 | Hayashi et al. | 428/34.5 |

(Continued)

FOREIGN PATENT DOCUMENTS

| | | |
|---|---|---|
| DE | 1 029 631 | 2/1955 |
| DE | 47 837 | 5/1966 |

(Continued)

*Primary Examiner* — James Hook
(74) *Attorney, Agent, or Firm* — Bacon & Thomas, PLLC

(57) ABSTRACT

A pipeline or measuring tube having at least one insulating layer, at least in certain regions, and comprising, manufactured in a primary shaping method, a tubular element, which has an otherwise closed structure and which has at least one region with an open-pored, cellular structure, wherein the material of the insulating layer, in the applying of the insulating layer, can penetrate into the pores of the open-pored, cellular structure of the tubular element and the insulating layer has on the side to be insulated a closed, homogeneous structure.

12 Claims, 2 Drawing Sheets

(56) References Cited

U.S. PATENT DOCUMENTS

| | | | |
|---|---|---|---|
| 4,773,448 A * | 9/1988 | Francis | 138/28 |
| 5,400,602 A * | 3/1995 | Chang et al. | 62/50.7 |
| 6,000,437 A * | 12/1999 | Ponder et al. | 138/149 |
| 6,202,702 B1 * | 3/2001 | Ohira et al. | 138/149 |
| 6,658,720 B1 | 12/2003 | Frey | |
| 6,877,386 B2 | 4/2005 | Needham | |
| 7,037,557 B2 * | 5/2006 | Keyes | 427/243 |
| 7,086,457 B2 * | 8/2006 | Kienbock et al. | 165/148 |
| 2003/0051764 A1 * | 3/2003 | Jungers | 138/149 |
| 2006/0162465 A1 * | 7/2006 | Sulzer et al. | 73/861.12 |
| 2007/0122269 A1 * | 5/2007 | Meier et al. | 415/173.1 |
| 2007/0295102 A1 * | 12/2007 | Sulzer et al. | 73/861.12 |
| 2011/0297269 A1 * | 12/2011 | Pilon et al. | 138/141 |

FOREIGN PATENT DOCUMENTS

| | | |
|---|---|---|
| DE | 2 011 714 | 3/1970 |
| EP | 0 036 513 | 9/1981 |
| EP | 0 581 017 | 2/1994 |
| EP | 0 608 793 | 8/1994 |
| EP | 1 039 269 | 9/2000 |
| JP | 59-137822 | 8/1984 |

* cited by examiner

PIPELINE OR MEASURING TUBE HAVING AT LEAST ONE LAYER WHICH INSULATES AT LEAST IN CERTAIN REGIONS, AND METHOD FOR THE MANUFACTURE THEREOF

TECHNICAL FIELD

The present invention relates to a pipeline, or a measuring tube, having at least one layer insulating at least in certain regions and a method for the manufacture thereof.

BACKGROUND DISCUSSION

By means of an insulating layer, an otherwise electrically conducting body can be insulated relative to a part of its environment. Above all, from the fields of magneto inductive flow measurement or pump manufacture, examples of such tubes are, per se, known to those skilled in the art. Conventionally, such pipelines, or measuring tubes, are composed of: a support tube, which is, most often, metal; an insulating layer; and a reinforcement provided in the insulating layer. The reinforcement can, in such case, be composed of a porous material. Usually, the reinforcement is introduced into the support tube and is in contact therewith. For this, most often, bronze spheres are sintered in the support tube.

An example thereof is the Promag H-series of Endress+Hauser having diameters smaller than 25 mm.

There are measuring tubes, especially those known from magneto inductive flow measurement, which are provided with a lining on the inside, in order to insulate the electrodes electrically relative to the support tube. This lining is usually called the 'liner'. An adhered or vulcanized or pressed-in liner has the disadvantage, that the adhesion between support tube and liner in the case of temperature, or pressure, fluctuations is not sufficiently assured. This can lead to release, for example, due to different coefficients of thermal expansion between support tube and liner or through arising negative pressure, this meaning, thus, that the accuracy of measurement is significantly degraded. Sprayed on or thermally melted on liners have, most often, lesser insulating properties, whereby measurement accuracy and the lifetime of the measuring tubes decreases.

To the state of the art belong securement designs, wherein the liner is secured on the inside of the support tube in a dovetail configuration, or bridge, designs. Such a pointwise securement cannot durably prevent release of the liner. Furthermore, support bodies are known, which are introduced into the support tube, in order to strengthen the liner. Among such support bodies is a pipe, or tube, having a slightly smaller outer diameter than the inner diameter of the support tube and a certain number of holes. Such a pipe, or tube, is introduced into the support tube and is completely surrounded by the insulating material. The number of holes is chosen carefully, since, in the case of large hole separation, the danger of release of the insulation from the pipe serving as a reinforcement is present. The amount of insulating material needed to completely coat the pipe serving as a reinforcement is relatively high.

A further support body is constructed of a lattice- or net-like or three dimensional weave, which can be produced from various materials, for example, from metal, which is introduced into the support tube and connected by pointwise bonding therewith and which is surrounded by the material of the insulating layer. In order to assure a sufficient stability of the liner, many points of securement are necessary. Reinforcement with such a support body is in the case of a conical curvature of the inner diameter of the measuring tube very complicated to implement.

A further support body is composed of a porous material, into whose pores the material of the insulating layer partially penetrates and so clings to the support body. Such a support body is described, for example, in EP1039269A1. The support body is of bending resistant material, which should assure for the thus reinforced liner a sufficient stability against release from the support tube or against folding of the liner or against a collapse of the liner protection. The porous support body must for this purpose not contact the support tube or be securely connected therewith.

EP0581017B1 describes a measuring tube with a porous support body, which is in contact with the support tube and the material of the insulating layer does not reach the inside of the support tube. Thus, pores on the side of the support body facing the support tube are unfilled.

All these designs have the disadvantage, that they are relatively complicated to manufacture and, therewith, relatively expensive. A seamless connection between support body and support tube, especially a material bonded, interlocking connection, which can absorb axial and radial forces, is not provided.

For manufacture of a pipeline, or of a measuring tube, with an insulating layer, there are known to those skilled in the art, methods which secure a support body in a prefabricated support tube or manufacture the support body in the support tube and then introduce the insulating layer into the support tube bearing installed support body. EP1039269A1 describes one such method, wherein, in the lumen of a prefabricated support tube, a porous support body is formed exactly fitting, by introducing a sinter core into the lumen of the support tube, which forms with the support tube a sinter space, into which sinter starting material of the support body is introduced and sintered. Then, the sinter core is removed and, following that, then a casting core is introduced into the lumen of the support tube with support body, which forms with the support tube a casting space, into which the liquefied starting material of the insulating layer is charged, which penetrates into the support body and solidifies, after which he casting core is removed.

It has been found that the separate introduction of a support body means a considerable manufacturing effort, especially when such is to fit accurately and/or be fixedly connected with the support tube and/or when apparatus-related features, such as, for example, openings for later introduction of electrodes or coil cores in the case of magneto inductive flow measuring devices, must be taken into consideration.

SUMMARY OF THE INVENTION

An object of the invention is, therefore, to provide, for industrial applications, especially for a magneto inductive flow measuring device, a cost effectively manufacturable pipeline, or measuring tube, having an insulating layer and a method for manufacture of such, which comprises few method steps and requires small manufacturing effort.

The object as regards the pipeline or measuring tube is achieved by the features that a tubular element, which has an otherwise closed structure, has at least one region with an open-pored, cellular structure, wherein the material of the insulating layer, in the applying of the insulating layer, can penetrate into the pores of the open-pored, cellular structure of the tubular element and the insulating layer has on the side to be insulated a closed, homogeneous structure.

The tubular element, which has a region with an open-pored, cellular structure and which otherwise has a closed structure, is one piece. According to the invention, this one piece, tubular element is produced with a primary shaping method. In this way, great freedom is provided as regards the embodying of the design. Support body and support tube are thus not two, separate from one another, and/or differently manufactured, bodies, which are connected together by material bonding and/or composed of the same material, but, instead the tubular element unites, or replaces, by its described construction, both support tube and support body. Hollows for bodies to be introduced, such as e.g. for the electrodes of a magneto inductive flow measuring device, can already be provided in the primary shaping process. Also, subsequently produced bores have a high strength and, associated therewith, high form stability. The pipeline of the invention, or the measuring tube of the invention, possesses strength greater than a comparable pipeline, or a comparable measuring tube, having an introduced sinter body as support body. The connection between tubular element and insulating layer is approximately constant over the entire length of the insulating layer. The pipeline, or the measuring tube, is thereby very resistant to shock involving negative pressure, positive pressure and temperature and, depending on material of the insulating layer, is suitable for hygienic applications.

In the following, by way of example, the application of the invention in a magneto inductive flow measuring device will be described. Besides in magneto inductive flow measuring devices and in flow measuring devices working based on ultrasound, and in pumps, other applications are imaginable, in which an insulating material must be placed in and/or on an, e.g. metal, pipe.

In an advantageous further development of the apparatus of the invention, the tubular element otherwise having a closed structure and its region with an open pored, cellular structure are of the same material. The apparatus of the invention is especially advantageous for tubes with standardized diameter <25 mm and for tubes with a diameter varying in size and/or shape over the length of the tube.

An advantageous embodiment of the apparatus of the invention provides that the tubular element is composed of a metallic material, especially a non-ferrous metal or a non-ferrous metal alloy. Especially advantageous are nickel alloys applied as non-ferromagnetic material. These alloys have very favorable properties, especially for magneto inductive flow measuring devices. Also other materials suited for industrial application and manufacturable with an open pored, cellular structure, such as e.g. aluminum alloys, zinc alloys, cobalt-chromium-tungsten alloys and some metal matrix, composite materials can be used.

An especially advantageous embodiment of the apparatus of the invention provides that the one piece, tubular element, equipped with a region having an open pored, cellular structure, and otherwise having a closed structure, is produced as a casting with an investment casting method.

Another advantageous embodiment of the apparatus of the invention provides that the material of the insulating layer is electrically non-conducting and non-magnetic. Such can be, for example, an organic, synthetic material, or plastic, or a natural polymer. The insulating layer is composed especially advantageously of an electrically non-conductive and non-magnetic, thermosetting, or elastomeric, or, especially, thermoplastic material. Especially, polyurethanes, in addition to hard rubber and fluorine-containing, synthetic materials, such as e.g. PTFE, PFA, have good chemical and mechanical properties and a good workability. The insulating layer is especially advantageously manufactured with a pressure casting, or injection molding, method, especially with a transfer molding method. However, also other methods can be used to manufacture the insulating layer and its associated, fixed connection with the open-pored, cellular structure of the tubular element.

In an advantageous form of embodiment of the apparatus of the invention, it is provided that the pore density of the open-pored, cellular structure of the tubular element otherwise having a closed, homogeneous structure lies in a range of 1 to 50 pores per inch (ppi). Especially advantageous is a pore density of 10 to 30 ppi. An additional, advantageous form of embodiment of the apparatus of the invention provides that the porosity of the open-pored, cellular structure of the tubular element otherwise having a closed, homogeneous structure lies in a range of 80 to 99%. Especially advantageous is a porosity of 92 to 98%. In this way, in combination with the advantageous pore density, a sufficient strength and stability of the open-pored, cellular structure with simultaneously sufficient penetration of the pores with the material of the insulating layer and a good stability of the insulating layer is provided.

Another especially advantageous embodiment of the apparatus of the invention provides that the pipeline, or the measuring tube, is part of a system for flow measurement, especially for magneto inductive flow measurement, or that the pipeline, or the measuring tube, is part of a pump.

A very advantageous embodiment of the apparatus of the invention provides that the open pored, cellular structure of the tubular element is located on the side of the homogeneous, closed structure of the tubular element facing a medium flowing in the pipeline, or in the measuring tube.

The side of the insulating layer with the closed, homogeneous structure is, accordingly, facing the medium flowing in the pipeline, or in the measuring tube. Especially, this form of embodiment is of advantage for flow measurement of the medium flowing in the pipeline, or in the measuring tube.

Another very advantageous embodiment of the apparatus of the invention is that in which the open pored, cellular structure of the tubular element otherwise having a closed, homogeneous structure faces the region of an opening provided in the tubular element. Such an opening is provided e.g. in the case of a magneto inductive flow measuring device, wherein into these openings e.g. electrodes are applied. Usually, also a number of openings can be provided in a tubular element.

In an additional, advantageous embodiment of the apparatus of the invention, the tubular element possesses a shoulder, which is in the closed structure of the tubular element and which points in the direction of an end of the tubular element.

In an additional, advantageous embodiment of the apparatus of the invention, the region of the open-pored, cellular structure of the tubular element extends over the region with the closed, homogeneous structure in the region of the shoulder in the direction of the end of the tubular element. This has process technical advantages, in the case of the introduction of the insulating layer. Thus, for example, a lesser flow resistance is achieved in the case of the mold filling, this meaning thus a higher material throughput. The mold is rapidly filled with approximately constant viscosity of the mold material (PFA).

According to an additional, advantageous embodiment of the apparatus of the invention, the wall thickness of the insulating layer is approximately constant.

Another advantageous embodiment provides that the inner character of the pipeline, or the measuring tube, can vary in size and shape over the length of the pipeline, or the measuring tube. Especially in magneto inductive flow measurement, tubes with a conical behavior of the interior of the tube over each half length of the tube are of advantage.

An especially advantageous embodiment of the apparatus of the invention provides that the tubular element and the insulating layer have a fixed, shape interlocking connection. In such case, the material of the insulating layer need not reach to the closed, homogeneous structure of the tubular element.

In a very advantageous form of embodiment of the apparatus of the invention, it is provided, that the material of the insulating layer reaches to the closed, homogeneous structure of the tubular element. The pores of the open pored, cellular structure of the tubular element otherwise having a closed, homogeneous structure are, especially advantageously, completely filled.

A supplemental embodiment of the apparatus of the invention is that in which the regions of the open pored, cellular structure and, correspondingly, the insulating layer lie on the outside of the tubular element.

A variant of the apparatus of the invention provides that inner and outer sides of the tubular element have regions of the open pored, cellular structure and an insulating layer.

For achieving the object, the invention resides, furthermore, in a method for manufacture of a pipeline, or of a measuring tube, having at least one insulating layer, at least in certain regions, wherein a tubular element, which has at least one region with an open-pored, cellular structure and which has otherwise a closed structure, is formed with a primary shaping method and, in a subsequent primary shaping method, an insulating layer is formed, wherein the material of the insulating layer penetrates into the pores of the open-pored, cellular structure of the tubular element and the insulating layer has on the side to be insulated a closed, homogeneous structure. In this way, great freedom is provided as regards the embodying of the design of the pipeline, or the measuring tube.

Another especially advantageous form of embodiment of the method of the invention provides, that the method for the manufacture of the pipeline, or the measuring tube, is applied in a case wherein the pipeline, or the measuring tube, is part of a system for flow measurement, especially for magneto inductive flow measurement or for flow measurement based on ultrasound or that the pipeline, or the measuring tube, is part of a pump.

In an advantageous further development of the method of the invention, the tubular element, which has at least one region with an open-pored, cellular structure and which has an otherwise closed structure, is formed with a primary shaping method from an essentially metallic material by means of a mold.

According to a very advantageous embodiment of the method of the invention, the tubular element, which has at least one region with an open-pored, cellular structure and which has an otherwise closed structure, is produced with a casting method, especially with an investment casting method.

These methods comprise usually essentially method steps explained as follows. A pattern of the open-pored, cellular structure, especially in the shape of a tubular element, is produced from a meltable, from an evaporatable or from a material dissolvable in a liquid, especially from a wax or from a synthetic material, especially from a thermoplastic material, for example, with a rapid-prototyping method or by foaming of a polymer, for example, polyurethane. The patterns are joined to form a so-called pattern cluster. To this pattern cluster belongs also the pattern of the tubular element with a closed structure. Onto the pattern cluster, mold material is applied, which clings to the pattern cluster, for example, by means of a binder suspension, for example, of the same mold material or of another mold material and a binding agent, e.g. ethyl silicate. This binder suspension is applied, for example, by immersion of the pattern cluster into the binder suspension. Further mold material, e.g. refractory quartz sand, is applied, for example, by scattering the sand on in some manner. Then, melt out, or burn out, of the pattern is performed. In such case, significant increasing of the volume of the material of the pattern is impermissible, in order not to endanger the integrity of the mold. Such methods are known as replica methods. An applying of an additional, front layer in and/or on the lost mold, e.g. through renewed immersion of the lost mold, which front layer comes in contact with the melt, thus the liquified material, of which the tubular element of the invention is composed and/or a backfill material and which in this regard has especially positive properties, can be avoided by intelligent choice of the binder suspension, alloy combination. The mold material is fired and forms then the lost mold for the actual casting step. A backfilling of the lost mold with further, loose mold material is possible, however, not absolutely required. Thereafter occurs the casting of the tubular element, which has at least one region with an open-pored, cellular structure and which has an otherwise closed structure, into the lost mold, with a liquified, investment casting capable material, especially a metallic material. The casting step occurs usually into the lost mold heated by the firing step or the lost mold is brought to a certain temperature by means of a corresponding tool. The removal of the mold material of the lost mold occurs, conventionally, by means of knocking the material off, vibration, use of pressurized air, water or sand blasting, ultrasound or through rinsing with acids or alkaline solutions.

Exact process parameters, such as e.g. mold temperature, casting temperature or cooling conditions, depend on the material used for the tubular element of the invention to be manufactured or on the mold material and/or the shape of the tubular element of the invention to be manufactured, especially the size of the open-pored, cellular structure. Requirements for the mold material are, among other things, a high temperature resistance, high accuracy of reproduction, high mechanical strength for the casting procedure, good release properties and high fluidity and a reaction passivity relative to the melt, thus relative to the material selected for the tubular element of the invention. In this regard, usually plaster-, phosphate- or sulfate-bonded, mold materials are used. As front layer, usually so called immersion slurries are used. Requirements for the front layer, supplementally to the requirements, which are placed on the mold material, are a good compatibility with mold material and an insignificant shrinkage, in the case of the drying. Among materials advantageous for the tubular element of the invention are, besides nickel- and brass alloys, also aluminum alloys, zinc alloys, cobalt-chromium-tungsten alloys and some metal matrix composite materials.

The casting process permits the manufacture of composite components, for example, of sponge components and solid components, in a single working step. In this way, the connection between open-pored, cellular structure, also called sponge material, and closed structure, or solid component, is of high quality. Through its open pored character, the sponge material can be infiltrated with other alloys. This infiltration is obtained, for example, in a gravity die casting-, pressure casting- or pressure difference method, also called investment casting.

Another advantageous embodiment of the method of the invention provides, that the pattern of the open-pored, cellular structure remains mechanically deformed in the face of warming before the joining together to the pattern cluster.

According to an additional, advantageous embodiment of the method of the invention, the particle size of the powder parts of the mold material is small in comparison to the pore size of the open-pored, cellular structure of the tubular element of the invention.

Another very advantageous form of embodiment of the method of the invention provides that the pattern of the open-pored, cellular structure fits into the pattern of the closed tubular element.

Another advantageous form of embodiment of the method of the invention provides, that a plurality of patterns of the open-pored, cellular structure are joined, e.g. in the case of conical behavior of the inner diameter of the pattern of the closed tubular element.

Another advantageous form of embodiment of the method of the invention provides, that a plurality of patterns with closed structure are joined to form a pattern of the closed, tubular element.

In an additional, advantageous form of embodiment of the method of the invention, it is provided, that the patterns of the closed tubular structure and/or the patterns of the open-pored, cellular structure contain hollows, or bores and/or raised portions, or cores and/or that additional patterns and/or cores are joined on, which later form hollows, or bores and/or shoulders or other functional shapes. An advantage of the primary shaping method is that complicated, or complex, structures can be produced in the mold of the apparatus of the invention and need not be produced by machining processes.

In an advantageous form of embodiment of the method of the invention, it is provided, that the pore density of the open-pored, cellular structure of the tubular element otherwise having a closed, homogeneous structure lies in a range of 1 to 50 pores per inch (ppi). Especially advantageous is a pore density of 10 to 30 ppi. An additional advantageous form of embodiment of the method of the invention provides that the porosity of the open-pored, cellular structure of the tubular element otherwise having a closed, homogeneous structure lies in a range of 80 to 99%. Especially advantageous is a porosity of 92 to 98%. In this way, in combination with the advantageous pore density, a sufficient strength and stability of the open-pored, cellular structure is provided, with simultaneous, sufficient penetration of the pores with the material of the insulating layer and a good stability of the insulating layer.

A supplemental embodiment of the method of the invention provides that the regions with the joined on patterns of the open pored, cellular structure lie on the outside of the patterns of the closed tubular element.

A variant of the method of the invention provides that inner and outer sides of the pattern of the closed tubular element have regions with joined on patterns of the open-pored, cellular structure.

An advantageous further development of the method of the invention provides that the tubular element of the invention, which has at least one region with an open-pored, cellular structure and which has an otherwise closed structure.

An advantageous form of embodiment of the method of the invention provides, that the tubular element of the invention, which has at least one region with an open-pored, cellular structure and which has an otherwise closed structure, is mechanically processed before the manufacture of the insulating layer.

According to an additional very advantageous further development of the method of the invention, the insulating layer of the pipeline, or the measuring tube, is produced with a casting method, especially with an injection molding, or a transfer molding, method.

These methods comprise, usually, essentially the following method steps:

Forming a casting space by means of a prefabricated tubular element, which has an otherwise closed structure and which has at least one region with an open-pored, cellular structure, and by means of a temporarily held mold, which determine the casting space for the material of the insulating layer and therewith the later shape of the insulating layer and which enclose the casting space casting tightly except for at least one sprue for the liquified material of the insulating layer, casting the liquefied material of the insulating layer into the casting space, and removing the temporarily held mold.

Those skilled in the art are familiar with the forming of an insulating layer, e.g. by means of a transfer molding method, e.g. from EP1039269A1, and, consequently, such is not further explained here.

According to a very advantageous embodiment of the method of the invention, a number of temporarily held molds are used.

Another very advantageous embodiment of the method of the invention provides, that the casting space between the temporarily held mold and the closed structure of the tubular element includes, at least in part, the open pored, cellular structure of the tubular element.

In an advantageous further development of the method of the invention, the liquefied material of the insulating layer penetrates into the open pored, cellular structure of the tubular element and solidifies, before the temporarily held molds are removed.

In an additional, advantageous form of embodiment of the method of the invention, it is provided, that in certain regions no temporarily held molds are provided, especially when patterns of the open-pored, cellular structure are placed between tubular patterns.

In an additional, advantageous form of embodiment of the method of the invention, it is provided, that the temporarily held molds contain hollows, or bores and/or raised portions, or cores, and/or that additional molds and/or cores are joined on, which form later hollows, or bores and/or shoulders or other functional forms. An advantage of the primary shaping method is that complicated, or complex, component structures can be produced and, thus, do not need to be produced by a machining step.

Another advantageous embodiment of the method of the invention provides that the material of the insulating layer is electrically non-conducting. This can be, for example, organic, synthetic material, or plastic, or natural polymer. The insulating layer is composed especially advantageously of electrically non-conductive and non-magnetic, thermosetting or elastomeric or, especially, thermoplastic materials. Especially polyurethanes have, besides hard rubber, and fluorine-containing, synthetic materials, such as e.g. PTFE, PFA, good chemical and mechanical properties and a good workability.

In a very advantageous form of embodiment of the method of the invention, it is provided, that the material of the insulating layer does not reach to the closed, homogeneous structure of the tubular element or that the material of the insulating layer reaches to the closed, homogeneous structure of the tubular element and the pores of the open pored, cellular structure of the tubular element otherwise having a closed, homogeneous structure are completely filled.

An advantageous form of embodiment of the method of the invention provides that the insulating layer is mechanically processed.

BRIEF DESCRIPTION OF THE DRAWINGS

The invention will now be explained in greater detail on the basis of the appended drawing, the figures of which show as follows.

DETAILED DISCUSSION IN CONJUNCTION WITH THE DRAWINGS

Figure 1:
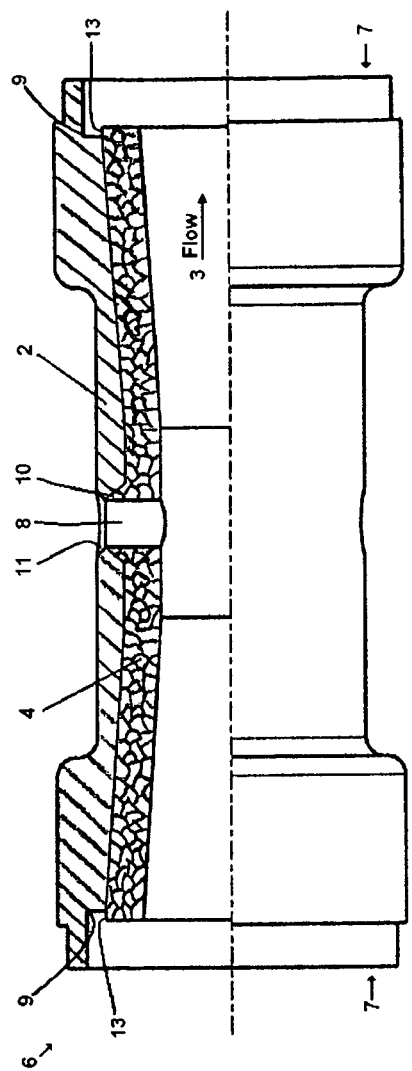
FIG. 1 shows a measuring tube of the invention, without an insulating layer and in partial section, for a magneto inductive flow measuring device.

FIG. 1 shows, in partial section, a measuring tube of the invention for a magneto inductive flow measuring device. In FIG. 1, the insulating layer is omitted. The side of the measuring tube 1 facing the measured medium 3 is, here, the side to be insulated.

A tubular element 6 for measuring flow of a measured medium 3 in the interior of the tube includes a closed, homogeneous structure 2 and, on the side of the closed structure 2 facing the measured medium 3, an open pored, cellular structure 4. The homogeneous, closed structure 2 surrounds the open pored, cellular structure 4, thus, coaxially and serves as outer form giving, as well as form stabilizing, jacket of the measuring tube 1. The transition from homogeneous, closed structure 2 to the open pored, cellular structure 4 is seamless.

Tubular element 6 is composed preferably of non-magnetic metal, e.g. of a nickel based alloy, and is produced in the investment casting method. The open pored, cellular structure 4 has an approximately constant thickness. For pressure-tight joining into a pipeline, through which a measured medium 3 can flow, the measuring tube 1 has an inlet side, first end and an outlet side, second end. These ends are the end faces 7 of the tubular element 6. The inner diameter of the tubular element 6 is, here, larger at the end faces 7, than in the middle. In this way, the tubular element 6 exhibits conical behavior of the inner diameter over its half lengths.

The tubular element 6 has in its closed, homogeneous structure 2 shoulders 9, which point in the direction of the end faces 7. The shoulders serve, among other things, for the sealing of the tool introducing the insulating layer 5. The open pored, cellular structure 4 projects in the direction of the end faces over these shoulders 9. In this region, the open pored, cellular structure 4 is not in direct coaxial contact with the homogeneous, closed structure 2, which coaxially surrounds the open pored, cellular structure 4. In this way, the homogeneous, closed, insulating layer 5 can, on the ends, completely enclose the open pored, cellular structure 4, so that, in the case of the measuring tube 1, the open pored, cellular structure is no longer visible and exhibits, in combination with the shoulders 9, a predetermined, easily manufacturable, approximately constant, layer thickness.

Furthermore, openings 8 for accommodating electrodes for measuring a voltage induced in the measured medium 3 are provided. In the region of these openings 8, the homogeneous, closed structure 2 on the side of the tubular element 6 facing the measured medium is countersunk. In the region of this first countersink 10 is located open pored, cellular structure, extending additionally to the axially parallel material, in the direction of the opening 8. In this way, the here not shown insulating layer 5 is also supported in the coaxial direction in the region of the openings 8 by the open pored, cellular structure. Also on its oppositely lying side, the homogeneous, closed structure 2 is countersunk. However, here this second countersink 11 is not so deep, that the open pored, cellular structure 4 shows toward the side of the tubular element 6 facing away from the measured medium 3.

In other forms of embodiment, a traversing, open pored, cellular structure 4 can extend in the region of the openings 8 to the side of the tubular element 6 facing away from the measured medium 3. An open pored, cellular structure 4, especially an open pored, cellular structure 4 with an approximately constant thickness, extending on both sides of the homogeneous, closed structure 2 and/or an uninterrupted open pored, cellular structure 4, cannot only be provided in the openings 8, but also on the end faces 7 of the measuring tube or between two layers of the closed structure 2 of the tubular element 6, for example, in a groove in the closed structure 2 of the tubular element 6.

Figure 2:
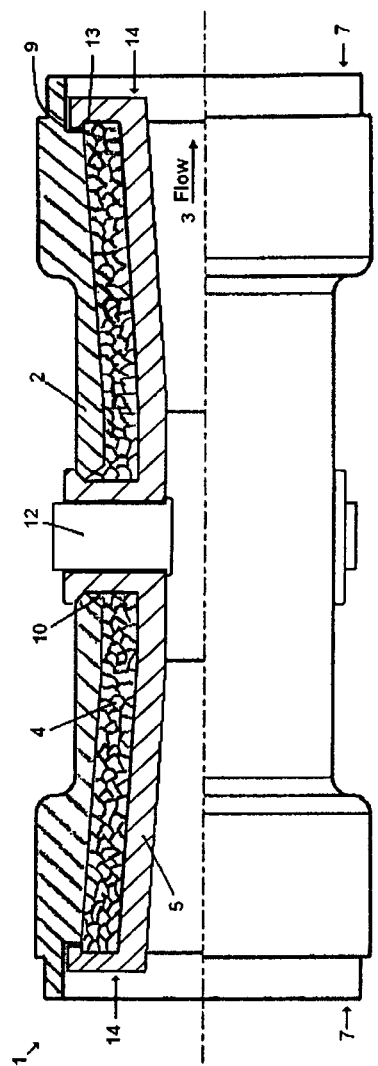
FIG. 2 shows a measuring tube of the invention with an insulating layer and in partial section, for a magneto inductive flow measuring device.

FIG. 2 shows, supplementally to FIG. 1, the insulating layer 5 of the measuring tube 1.

The measuring tube 1 comprises accordingly, besides the already known features, a coaxially surrounding, closed, homogeneous structure 2, an open pored, cellular structure 4 on the inside of the closed structure 2 and an insulating layer 5, which insulates the measuring tube 1 relative to the measured medium 3. The insulating layer 5 has a homogeneous, closed structure on the side facing the measured medium 3. The material of the insulating layer 5 penetrates, during the manufacture of the measuring tube 1, into the pores of the open pored, cellular structure 4 of the tubular element 6 and so forms a fixed connection with this.

The insulating layer 5 has an approximately constant wall thickness of the closed, homogeneous region, also on the end faces 7 or in the region of the opening 8. As usual in the case of magneto inductive flow measuring devices of smaller nominal diameter, the measuring tube 1 exhibits a conical behavior of the inner diameter over its half lengths, since also the thickness of the open pored, cellular structure 4 between the homogeneous closed insulating layer 5, which faces in the direction of the measured medium 3, and the closed structure 2 of the tubular element 6 is approximately constant over the length of the measuring tube 1.

Pressure-tightly inserted into the openings 8 are electrodes 12 for measuring a voltage induced in the measured medium 3. The insulating layer 5 is supported in the direction of the opening 8 by the electrodes 12, whereby the shown embodiment of the funnel shaped approaching, open-pored, cellular structure 4 is sufficient to guard the insulating layer 5 against release from the tubular element 6. Therefore, the countersinks 10, 11 are shaped such that on the side of the closed structure 2 of the tubular element 6 facing away from the measured medium 3, no open pored structure 4 of the tubular element 6 is present.

At the shoulders 9, the open pored, cellular structure 4 projects over the shoulders 9 in the closed structure 2 of the tubular element. Thus, the homogeneous, closed, insulating layer 5 has in the direction of the end faces 7 of the measuring tube 1 coaxial faces 14, which have a smooth and planar surface up to the edge. Without this projection 13, the insulating layer 5 would have, without other processing, no planar, smooth surface up to the edge facing in the direction of the end faces 7 and the tool for introduction of the insulating layer 5 could, manufacturing contingently, not be sealed.

The invention claimed is:

1. A pipeline or a measuring tube, having:
    a tubular element having a closed homogenous structure surrounding an open-pored cellular structure, said tubular element consisting of metallic material;
    and
    at least one insulating layer, surrounding said open-pored cellular structure, wherein:
    the material of said at least one insulating layer, in the applying of said at least one insulating layer, penetrates into the pores of said open-pored, cellular structures;
    said at least one insulating layer has, on the side to be insulated, a closed, homogeneous structure; and the transition from said closed homogenous structure to said open-pored cellular structure is seamless.

2. The pipeline or measuring tube as claimed in claim 1, wherein:
said open-pored, cellular structure is produced by an investment casting method.

3. The pipeline or measuring tube as claimed in claim 1, wherein:
said at least one insulating layer is produced by a casting method, especially a pressure casting or injection molding method.

4. The pipeline or measuring tube as claimed in claim 1, wherein:
the pore size of said open-pored, cellular structure amounts to 1-50 ppi.

5. The pipeline or measuring tube as claimed in claim 1, wherein:
the porosity of said open-pored, cellular structure amounts to 80-99%.

6. The pipeline or measuring tube as claimed in claim 1, wherein:
the pipeline or measuring tube is part of a system for flow measurement, especially magneto inductive flow measurement.

7. The pipeline or measuring tube as claimed in claim 1, wherein:
the region with the open-pored, cellular structure is facing the side of a medium flowing in said tubular element.

8. The pipeline or measuring tube as claimed in claim 1, wherein:
the region with the open-pored, cellular structure is on the side of an opening in said tubular element.

9. The pipeline or measuring tube as claimed in claim 1, wherein:
said tubular element has at an end a shoulder in said closed structure, said shoulder points in the direction of said end.

10. The pipeline or measuring tube as claimed in claim 9 wherein:
the region with the open-pored, cellular structure projects at said end of said tubular element over said shoulder of said closed structure in the direction of said end.

11. The pipeline or measuring tube as claimed in claim 1, wherein:
the wall thickness of the closed, homogeneous structure of said at least one insulating layer is approximately constant.

12. The pipeline or measuring tube as claimed in claim 1, wherein:
the inner size of the pipeline or measuring tube, can vary over a length of the pipeline or the measuring tube.

* * * * *